United States Patent
Gerhardt et al.

(10) Patent No.: US 10,384,886 B2
(45) Date of Patent: Aug. 20, 2019

(54) ROBOT GRIPPER TRANSFER DEVICE FOR PICKING UP A PRODUCT

(71) Applicant: WEBER MASCHINENBAU GmbH BREIDENBACH, Breidenbach (DE)

(72) Inventors: Markus Gerhardt, Biedenkopf (DE); Christoph Kuhmichel, Bad Laasphe (DE); Thomas Nispel, Dautphetal (DE); Ingo Rother, Breidenbach (DE); Andreas Runkel, Biedenkopf (DE); Julia Walsch, Erndtebrück (DE); Steffen Zecher, Staufenberg (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 3 days.

(21) Appl. No.: 15/585,386

(22) Filed: May 3, 2017

(65) Prior Publication Data
US 2017/0320678 A1 Nov. 9, 2017

(30) Foreign Application Priority Data
May 3, 2016 (DE) .......... 10 2016 108 212

(51) Int. Cl.
*B65G 47/90* (2006.01)
*B25J 15/00* (2006.01)
(Continued)

(52) U.S. Cl.
CPC .......... *B65G 47/90* (2013.01); *B25J 15/0014* (2013.01); *B65B 5/024* (2013.01); *B65B 11/004* (2013.01);
(Continued)

(58) Field of Classification Search
CPC ........ B65G 47/66; B65G 47/90; B65B 63/04; B25J 15/0014
(Continued)

(56) References Cited

U.S. PATENT DOCUMENTS 2,768,492 A 10/1956 Kay et al.
4,621,852 A * 11/1986 Maki ................. B25J 15/10
294/67.22

(Continued)

FOREIGN PATENT DOCUMENTS

AT 402036 B 8/2008
DE 2447835 A1 4/1975
(Continued)

OTHER PUBLICATIONS

Communication received from the European Patent Office for related EP Application No. 17163888.5; 14 pages.
(Continued)

*Primary Examiner* — Paul T Chin (57) ABSTRACT

A transfer device, in particular as a robot gripper, for picking up at least one product disposed on a base section of a product carrier and the product carrier from a conveying and/or processing device for the product and/or for the product carrier and for delivering the product together with the product carrier to a device, in particular a packaging machine, arranged downstream, is characterized in that the transfer device has a pivoting device for pivoting a cover section connected to the base section about a kink line extending between the cover section and the base section.

25 Claims, 7 Drawing Sheets

(51) Int. Cl.
*B65B 25/06* (2006.01)
*B65B 49/02* (2006.01)
*B65B 49/08* (2006.01)
*B65B 49/10* (2006.01)
*B65B 49/12* (2006.01)
*B65B 49/14* (2006.01)
*B65B 5/02* (2006.01)
*B65B 11/00* (2006.01)
*B65B 11/06* (2006.01)

(52) U.S. Cl.
CPC .............. *B65B 11/06* (2013.01); *B65B 25/06* (2013.01); *B65B 49/02* (2013.01); *B65B 49/08* (2013.01); *B65B 49/10* (2013.01); *B65B 49/12* (2013.01); *B65B 49/14* (2013.01)

(58) Field of Classification Search
USPC ................................. 294/86.4; 198/403, 399
See application file for complete search history.

(56) References Cited

U.S. PATENT DOCUMENTS

| | | | | |
|---|---|---|---|---|
| 4,805,374 | A * | 2/1989 | Yawberg | B65B 63/04 270/32 |
| 5,006,037 | A * | 4/1991 | Bluemle | B65B 25/141 198/403 |
| 5,024,575 | A * | 6/1991 | Anderson | B65G 47/90 294/2 |
| 5,515,796 | A * | 5/1996 | Ogle | D05B 11/005 112/2.1 |
| 5,704,191 | A * | 1/1998 | Wallace | B65B 63/04 53/116 |
| 5,768,857 | A | 6/1998 | Ward et al. | |
| 5,996,861 | A * | 12/1999 | Propach | D06F 89/02 223/37 |
| 6,109,007 | A | 8/2000 | Combs et al. | |
| 2001/0030103 | A1* | 10/2001 | Runonen | B65G 47/248 198/403 |
| 2002/0108540 | A1* | 8/2002 | Underbrink | B65D 19/42 108/55.3 |
| 2007/0248446 | A1* | 10/2007 | Wildner | B65G 61/00 414/788 |
| 2012/0086226 | A1* | 4/2012 | Weber | B25J 11/0045 294/81.54 |
| 2012/0146350 | A1* | 6/2012 | Weber | B25J 15/0266 294/81.54 |
| 2012/0161459 | A1* | 6/2012 | Weber | B25J 15/0266 294/106 |

FOREIGN PATENT DOCUMENTS

| | | |
|---|---|---|
| DE | 10045055 A1 | 3/2002 |
| DE | 102011121642 B3 | 6/2013 |
| DE | 102013001110 A1 | 8/2014 |
| EP | 2543484 B1 | 1/2013 |
| EP | 2559625 A1 | 2/2013 |
| WO | 9857852 A2 | 12/1998 |
| WO | WO 01/70578 * | 9/2001 |

OTHER PUBLICATIONS

Communication received from the German Patent Office; dated Jan. 11, 2017; 2 pages.

* cited by examiner

ROBOT GRIPPER TRANSFER DEVICE FOR PICKING UP A PRODUCT

This application claims priority to German Patent Application No. 102016108212.0 filed on May 3, 2016, which is incorporated herein by reference in its entirety.

The present invention relates to a transfer device, in particular as a robot gripper, for picking up at least one product disposed on a base section of a product carrier and the product carrier from a conveying and/or processing device for the product and/or for the product carrier and for delivering the product together with the product carrier to a device, in particular a packaging machine, arranged downstream. The invention also relates to methods for handling products.

Product carriers, that are also called L boards, are normally flat, preferably rectangular, board-like structures, e.g. composed of cardboard or paper, that can be divided into a base section and into a cover section disposed in a marginal region of the product carrier. Provision is made that a food product such as a portion of a food product comprising a plurality of slides is placed on the base section of a product carrier disposed on a support surface and that the cover section is then pivoted or folded upwardly and to the side in the direction of the base section about a kink line that extends between the base section and the cover section such that the cover section at least partly covers the product.

The product carrier can be delivered together with the product to a packaging machine in which the combination of product carrier and product is packaged. The product is partly covered by the pivoted or folded cover section in the packaging, whereby the presentation of the product is improved.

EP 2 559 625 A1 describes a food processing apparatus for product sections of a food that has a combining apparatus in which the product sections are combined with product carriers. A product carrier delivery system is configured to combine a respective specific product carrier of at least two different kinds of product carriers with the product section in dependence on a property of the product sections. The product carrier delivery system has a product carrier feed that provides different kinds of product carriers from different stocks of product carriers in a product carrier store and, when a product section runs past the product carrier feed, provides a product carrier, in dependence on the property of the product section, that is combined with the product section.

A folding device or a method for machining one or more L boards is known from DE 10 2011 121 642 B3.

The product carriers with a product disposed thereon can be provided by the conveying and/or processing device. This device can, for example, be a slicing machine for food products that are also called high-performance slicers and an apparatus for providing the product carriers and for placing the produced products onto the product carriers is arranged downstream.

A high-performance slicer is described, for example, in EP 2 543 484 A1.

A transfer device, which can be a robot gripper of a robot, can be used for delivering a product carrier with a product lying thereon to a device, in particular a packaging machine, arranged downstream. The transfer device can pick up the product carrier together with the product and can deliver it to the packaging machine, e.g. by placing the product carrier and the products into a packaging.

It is the underlying object of the present invention to provide an improved transfer device that is expanded in its functions.

The object is satisfied by a transfer device having the features of claim 1 and in particular in that a transfer device of the initially named kind is further developed in that it has a pivoting device for pivoting a cover section connected to the base section about a kink line (also known, and referred to herein as a "folding line") extending between the cover section and the base section.

Provision is made in the transfer device in accordance with the invention that it can pivot the cover section about the kink line with respect to the base section and can thus effect an at least part covering of the product disposed on the base section by the cover section. A pivoting device arranged upstream, for example arranged in the region of the conveying and processing device, can thus be saved or can be configured such that it only partly pivots or only raises the cover section.

A "complete" product, including a product carrier with a folded cover section, can be produced by means of the transfer device and can, for example, be delivered to a packaging machine, e.g. by placing the complete product into a packaging.

The product can be a food. The product can, for example, comprise a slice or a portion having a plurality of slices of at least one food such as sausage, meat or cheese. The slices can be arranged stacked over one another, for example, in a portion.

The transfer device can be a robot gripper or at least a part of a robot gripper. The pivoting device can be integrated in or arranged at the robot gripper or in/at its gripping claws. The pivoting device can be actuated by using a movement of the robot gripper or of the robot at which the gripper is arranged, in particular such that it pivots or folds the cover section about the kink line. The pivoting device can also have a folding device that can be actuated, in particular also independently of a gripper movement, by means of a pneumatically actuable cylinder or by means of another drive, for example.

The transfer device can have at least one movable gripping device, in particular comprising a claw, preferably having a claw blade, for at least partly gripping beneath at least the cover section of the product carrier. The product carrier can be grasped and picked up by means of the at least one gripping device.

Two gripping devices, in particular claws having a respective claw blade, are preferably provided that carry out a gripping movement for picking up a product carrier, in which gripping movement the gripping devices move toward one another in opposite directions. The pivoting device can be arranged at the gripping device or at one of the two gripping devices. The pivoting device can thereby be brought into contact with the cover section, in particular when the gripping device engages beneath the cover section in accordance with its intended purpose. For this purpose, the pivoting device is advantageously arranged at the side of the gripping device, for example at the upper side of a claw blade, that is located beneath the cover section when the gripping device engages beneath the cover section.

The pivoting device can also be formed by a part of the gripping device. This part is advantageously configured and arranged such that the pivoting device can come into contact with the cover section, in particular when the gripping device engages beneath the cover section. The pivoting device can be integrated in the gripping device, for example.

The pivoting device is preferably actuable by means of a movement of the gripping device for pivoting the cover section. A separate drive for the pivoting device can thus be saved. An actuation device such as a drive can naturally, however, also be provided for the pivoting device. The pivoting device can therefore also be actuable independently.

In accordance with a preferred embodiment of the invention, the transfer device has at least one downholder, that can in particular be moved up and down, for holding down the product and/or for fixing the product carrier, in particular along the kink line. The product carrier can thus be fixed in its location, in particular while the cover section is pivoted. The downholder can preferably be lowered onto the product carrier, preferably coming from above, and preferably onto the product disposed thereon or next to the product. The downholder can fix the product carrier in the region of the kink line. For this purpose, the downholder preferably has a rail-like shape whose width preferably approximately corresponds to the length of the kink line.

The gripping device is preferably at least partly movable beneath the cover section of the product carrier, that is preferably disposed on a support surface of the conveying and/or processing device, for engaging beneath the cover section. The gripping device can therefore be moved, in particular by means of a robot arm at which it is arranged, toward the product carrier to pick up the cover section. It is particularly advantageous if the gripping device can be moved beneath the cover section to engage beneath the cover section, coming from the side remote from the base section or at least coming from a side in the direction of the kink line since then the cover section can be simply pivoted by means of the movement of the gripping device.

A further, second gripping device can be movable to engage beneath the base section at least partly beneath the base section of the product carrier that is preferably disposed on the support surface of the conveying and/or processing device, in particular coming from the side remote from the cover section. The product carrier can be picked up by means of the two gripping devices by engaging beneath the base section and the cover section, in particular from two sides.

The pivot device is preferably arranged at the gripping device such that it is disposed beneath the cover section when the gripping device at least partly engages beneath the cover section and such that the pivoting device is adjustable with respect to the cover section from a starting position into an end position for pivoting the cover section about the kink line. The pivoting device can therefore move into contact with the cover section when the gripping device engages beneath the cover section and the pivoting device can be pivoted from the starting position into the end position by adjusting the pivoting device such that it entrains the cover section and pivots it about the kink line.

To adjust the pivoting device from the starting position into the end position and vice versa, the pivoting device can be pivotable about a pivot axis that preferably extends at least approximately in parallel with the kink line.

In the starting position, the pivoting device preferably contacts the gripping device, whereas it is moved toward the cover section by a specific pivot angle to reach the end position such that it entrains the cover section and in so doing pivots it about the kink line.

The pivoting device can be coupled to the second gripping device and can be actuable by means of the second gripping device. The pivoting device can thus be actuated for pivoting the cover section by a movement of the second gripping device for picking up the product carrier.

In accordance with a preferred embodiment of the invention, the pivoting device comprises a slide element that is arranged at the gripping device such that it is located before the edge of the cover section remote from the base section when the gripping device at least partly engages beneath the cover section and such that the slide element is movable, in particular by means of a preloaded spring, in the direction of the cover section for pivoting the cover section. The cover section can therefore be pivoted about the kink line by means of the slide element.

An abutment for the cover section is preferably arranged at the gripping device, in particular above the slide element, wherein the abutment can be brought into contact with the cover section and is movable toward the cover section, in particular by means of the gripping device, in particular after a moving back of the slide element into its starting position, by means of a movement of the gripping device in the direction of the cover section. The cover section can, for example, be pivoted into its provided end position and can be held in this end position by means of the abutment, for example until the product carrier and the product are delivered to the device arranged downstream.

The transfer device can have at least one gripping device for picking up the product carrier together with the product disposed on the base section, with the gripping device picking up the product carrier such that the cover section is freely accessible and such that the gripping device delivers the cover section to a folding device by means of which the cover section is pivoted relative to the base section about the kink line. The pivoting of the cover section can thus be effected by the cooperation between the gripping device and the folding device.

The gripping device can have a holding device by means of which the base section is held in contact with the claw blade. The holding device can be formed by at least one pin-like element that extends above the support surface for the base section formed by the claw blade and preferably in parallel with an outer edge of the claw blade, with a gap being formed between the support surface and the element that approximately corresponds to the thickness of the product carrier.

Provision can in particular be made that the pivoting of the cover section takes place by a movement of the gripping device relative to the folding device that is preferably arranged rigidly in an associated working region or that the folding device is movable in addition to or alternatively to the gripping device to effect a pivoting of the cover section by a relative movement between the folding device and the gripping device. A pivoting of the cover section can thus be achieved by moving at least one of the two devices relative to the other device.

The pivoting device can comprise a suction apparatus, in particular a vacuum rail, for fixing and/or sucking in the product carrier, in particular along the kink line. A fixing of the product carrier can be effected in a simple, hygienic manner by the suction apparatus. The product carrier can be released again by deactivating the suction apparatus.

The suction apparatus can be arranged at a gripping device for a part gripping beneath of the product carrier, in particular such that the suction apparatus is arranged at least substantially beneath the kink line when the gripping device engages beneath the product carrier in accordance with its intended purpose. The suction apparatus can thus be arranged directly beneath or next to the kink line to fix the product carrier in the region of the kink line.

In accordance with a preferred embodiment of the invention, the pivoting device comprises at least one flap pivotable about a pivot axis. A pivoting of the cover section can be effected by means of this.

The flap at a gripping device is preferably arranged at a gripping device pivotable about the pivot axis for a part gripping beneath the product carrier. When the gripping device engages beneath the product carrier, the flap can thus come into contact with the cover section to pivot it.

The flap can be pivotably attached or connected in an articulated manner to a lateral outer edge of the gripping device and preferably to the lateral outer edge of a claw blade. The product carrier can be picked up such that its base section lies on the claw blade while the flap is located beneath the cover section. The cover section can be entrained and pivoted about the kink line by pivoting the flap upwardly.

The gripping device can have a holding device by means of which the base section is held in contact with the claw blade. The holding device can be formed by at least one pin-like element that extends above and in the direction of the pivot axis above the support surface for the base section formed by the claw blade, with a gap that approximately corresponds to the thickness of the product carrier being formed between the support surface and the element.

A drive is preferably provided for pivoting the flap such that the flap can be actuated independently of a movement of the gripping device.

The drive can be arranged at the gripping device such that the drive can be located in direct proximity with the flap. The drive can thereby be kept compact and a transfer mechanism between the drive and the flap can be implemented with a little effort or can be avoided.

The flap preferably has a slit into which the cover section can be threaded, with the gripping device being controllable such that it threads the cover section into the slit, in particular during the engaging beneath the product carrier. The cover section can thus be securely grasped by the flap and entrained on the pivoting of the flap.

The flap can be movable upwardly and/or to the side, in order to release the cover section, in particular after the pivoting process.

In accordance with a preferred further development of the invention, at least one further movable flap, in particular a pivotable flap, is arranged at the gripping device, in addition to the at least one flap having a slit, with provision being made that the cover section is pivoted by means of the flap having a slit up to an intermediate position and the flap having a slit is subsequently moved away upwardly and/or to the side to release the cover section and that the cover section is then pivoted further by means of the further flap from the intermediate position into an end position. The cover section can be held in the end position by the further flap, in particular for so long until the product carrier is transferred to the packaging machine.

In accordance with a preferred embodiment of the invention, the pivoting device can have a pressing device, in particular a disk or the like, that is rotatable about an axis of rotation and whose outer periphery can be brought into contact with the cover section, with the outer periphery having a contour that is in particular of sickle shape and by means of which a pivoting of the cover section about the kink line is effected by a rotation of the pressing device about the axis of rotation. The contour can form a cam follower that is brought into contact with the cover section and is traveled past the cover section by rotating the pressing device, with the cover section being pivoted by the contour in conjunction with the rotational movement.

The axis of rotation preferably extends eccentrically to the middle of the pressing device. A pivot movement of the cover section can be effected by the eccentrically supported pressing device by means of a rotation of the pressing device.

The pressing device can be drivable by means of a movement of the gripping device. A separate drive for the pressing device is thus not necessary. A separate drive for the pressing device can nevertheless also be provided.

The axis of rotation can be adjustable. The axis of rotation can in particular be adjustable, preferably displaceable, during a pivoting of the cover section, in particular such that the pressing device is moved toward the cover section. The cover section can thereby be pivoted over a larger region.

In accordance with a further development of the invention, the at least one gripping device has a support surface, preferably formed by a claw blade, for the product carrier, wherein the support surface has a front edge formed in the manner of a wedge and wherein provision is made that the product carrier is engaged beneath with the front edge at the front. When the cover section is engaged beneath at its side remote from the kink line with the front edge at the front, its wedge shape has the result that the cover section is raised. A subsequent pivoting procedure can thereby be improved.

The invention also relates to a robot having a transfer device in accordance with the invention that forms a gripper or at least a part of the gripper of the robot. The transfer device can thus be at least a part of the robot gripper with which, for example, a product carrier together with a product disposed thereon can be delivered to a packaging machine disposed downstream. Since a pivoting of the cover section is effected by the transfer device, in particular such that the cover section covers the product at least partly, a pivoting device arranged upstream or a pivoting device in the packaging machine can be saved. The product carrier with a product disposed thereon can thus be transferred to the packaging machine with a pivoted or folded cover section or can be directly placed into a packaging.

The invention also relates to a conveying line having a transfer device in accordance with the invention and/or having a robot in accordance with the invention, wherein the transfer device is arranged, viewed in the conveying direction, between the conveying and/or processing device and the packaging machine, and/or wherein the robot is configured for transferring a product carrier with a product disposed thereon by means of the transfer device from the conveying and/or processing device to the packaging machine.

In the transfer device in accordance with the invention, the contact of a gripping device with e.g. a support can be utilized to store energy from the movement of the gripping device in the gripping device that can be used for the folding process or for a folding device.

When the gripping device is placed onto the support, a folding or pivoting device is e.g. brought into a starting position, in particular preloaded, preshaped, fixed and/or latched; for example by means of a spring preload, a sensing roller and/or a cushioning of the gripping device, in particular claws. In addition, folding metal sheets and flaps, etc. could be brought back into a starting position when the travel path of a gripping device is not sufficient for this purpose. A raising of the gripping device can produce a folding procedure, either a complete or partial folding procedure since the movement energy being released can be utilized. Alternatively or additionally, a first opening movement or a rotational movement of the gripping device relative to the base could trigger the folding by releasing the preload. A mechanism for energy storage can then be relaxed. It could be preloaded on the next gripper stroke.

The invention also relates to a method of handling products, in particular portions that comprise one or more slices cut off from a food such as a loaf of sausage or cheese, in which at least one product is placed onto a base section of a product carrier that comprises a cover section connected to the base section, in which the product carrier is fixed on a support, in particular on a transfer device, preferably as disclosed herein, and in which the cover section is pivoted, in particular by rising up and relocating in the direction of the product.

The fixing of the product carrier on the support can e.g. take place by a downholder or by applying a vacuum.

The pivoting of the cover section can take place, for example, by movements of one or more components of a transfer device, e.g. by moving the claws of a robot gripper. Alternatively, the pivoting can take place by an additional kink element or by an additional kink apparatus.

The pivoted cover section can additionally be fixed.

The invention further relates to a method of handling products, in particular portions that comprise one or more slices cut off from a food such as a loaf of sausage or cheese, in which a product carrier that comprises a base section and a cover section connected to the base section and that serves to carry at least one product lying on the base section is fixed on a support, in which the cover section is pivoted onto a lying product, in which the product carrier together with the product fixed between the base section and the cover section is fixed with respect to the support by means of a downholder, and in which the product carrier together with the product is taken up by means of a transfer device, preferably as disclosed herein, engaging between the support and the base section.

In these methods, a respective fixing of the product, that is in particular permanent for a transfer procedure, can take place by the product carrier, in particular by means of the pivoted cover section. This fixing can e.g. take place by means of a snap-in device, by means of separate fixing aids or by means of a band.

The aspects of the apparatus disclosed herein and the aspects of the methods disclosed herein can generally be combined with one another as desired. The corresponding apparatus means disclosed herein can in particular be used for the aspects of the methods. In other words, the disclosed method steps can each be carried out using the corresponding apparatus or components suitable for this purpose.

The invention will be explained by way of example in the following with reference to preferred embodiments. There are shown, schematically in each case, FIGS. 1 to 3 side views of a variant of a transfer device in accordance with the invention.

Figure 1:
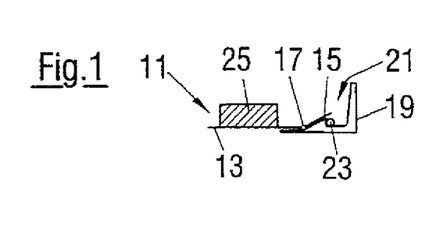
Figure 2:
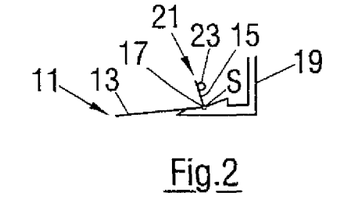
Figure 3:
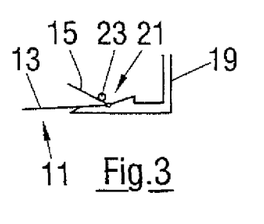

FIGS. 1 to 3 show a transfer device which can in particular be a part of a robot gripper for picking up a product 25 disposed on a base section 13 of a product carrier 11 together with the product carrier 11. The product carrier 11 with the product 25 disposed thereon can, for example, be provided by a conveying and/or processing device, not shown, for the product 25 and/or for the product carrier 11.

Such a conveying and/or processing device can, for example, be a food slicing machine that is also called a high-performance slicer, that is arranged downstream of a device for providing the product carriers 11 and for placing a respective product 25 onto the base section 13 of a product carrier 11.

The food product can be a slice of a food product such as sausage, meat or cheese, or also a portion, for example a stacked portion, of a food product comprising a plurality of slices. The slice or portion can, for example, be produced by means of a high-performance slicer.

The combination of product carrier 11 and product 25 picked up by the transfer device of FIGS. 1 to 3 can be delivered to a packaging machine by means of the transfer device and can, for example, be placed directly into a packaging (not shown) by the transfer device.

As FIGS. 1 to 3 show, the transfer device has a gripping device 19 that is movable in the form of a claw and that can at least partly engage beneath the cover section 15 of the product carrier 11. A pivoting device 21 is arranged at the gripping device 19 and comprises in the variant of FIGS. 1 to 3 a pivotable hoop 23 that is arranged at the upper side of the claw-like gripping device 19 such that it is located beneath the cover section 15 when the gripping device 19 engages beneath it.

The hoop 23 is connected in an articulated to the mentioned upper side of the gripping device 19 pivotable about a pivot axis S. By pivoting the hoop 23 from its starting position shown in FIG. 1 into the end position shown in FIG. 3, the cover section 15 of the product carrier 11 is pivoted about a kink line (also known as a "folding line") 17 extending between the cover section 15 and the base section 13.

A pivoting of the cover section 15 by means of a pivoting of the hoop 23 can be achieved particularly simply in that the gripping device 19 engages beneath the cover section 15 coming from the side remote from the base section 13 and in that the pivot axis S of the hoop 23 is at least substantially aligned in parallel with the kink line 17. The hoop 23 can then be moved from its starting position shown in FIG. 1 upwardly into its end position shown in FIG. 3. In this respect, the hoop 23 entrains the cover section 25 and pivots it about the kink line 17.

An actuation mechanism can be provided to move the hoop 23 from its starting position into its end position. This actuation mechanism can comprise a holder that holds the hoop 23 in its starting position. In addition, the hoop 23 can be preloaded in the starting position in the direction of the end position by means of a spring.

The holder can release the hoop 23, whereby the hoop 23 is moved from the starting position into the end position due to the preload.

Provision can also be made that the pivoting device 21 or the hoop 23 is moved by means of a movement of the gripping device 19 that is moved beneath the product carrier 11 to pivot the cover section 15. A return of the hoop 23 into its starting position can also be effected by a movement of the gripping device 19 or independently of a movement of the gripping device 19, for example by means of a return device provided for this purpose.

Figure 4:
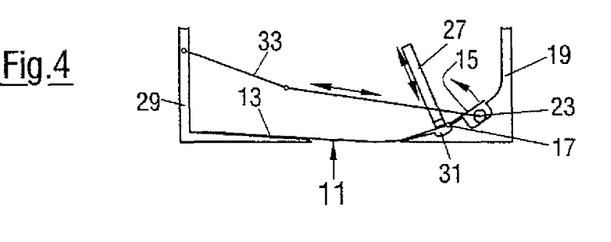
FIG. 4 a side view of a further variant of a transfer device in accordance with the invention.

FIG. 4 shows a modified variant of the transfer device shown with respect to FIGS. 1 to 3. The transfer device of FIG. 4 shows a further, second gripping device 29 in addition to the first gripping device 19. The two gripping devices 19, 29 can be formed in claw shape and can be moved toward one another, coming from mutually oppositely disposed sides, for picking up or engaging beneath a product carrier 11 with a product lying on the base section 13 of the product carrier 11. Provision is in particular made that the first gripping device 19 is moved beneath the cover section 15, coming from the side remote from the base section 13, for engaging beneath the cover section 15, while the second gripping device 29 is moved at least partly beneath the base section 13, coming from the side remote from the cover section 15, for engaging beneath the base section 13.

In addition, a downholder 27 is provided that can be brought from above into contact with the product carrier 11 to fix it. In this respect, the downholder 27 comes into contact with the product carrier 11, preferably in the region of the kink line 17. A groove 31 is applied beneath the downholder 27 in the claw blade forming the gripping device 19, said groove supporting a pivoting of the cover section 15 about the kink line 17 in combination with the downholder 27. The downholder 27 can be moved away upwardly again during the pivoting procedure of the cover section 15 in order not to cause a blocking of the pivoting movement.

In the variant of FIG. 4, the hoop 23 is coupled to the second gripping device 29 via a coupling device 33. The coupling device 33 is configured such that the hoop 23 can be moved from its starting position shown in FIG. 4 for pivoting the cover section 15 about the kink line 17 into an end position (cf. FIG. 3), that is not shown with respect to the variant of FIG. 4, by a movement of the second gripping device 29, in particular in the direction of the first gripping device 19.

Figure 5:
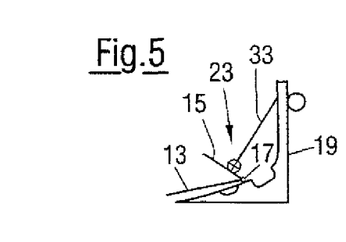
FIG. 5 a lateral part view of a modification of the variant of FIG. 4.

FIG. 5 shows a modified variant of a transfer device in which the hoop 23 is actuated via a coupling device 33 coupled to the first gripping device 19. The folding hoop 23 can thus be brought from its starting position into its end position shown in FIG. 5 by means of the coupling device 33 by a movement of the first hoop 19 in the direction of the second hoop 23 and the cover section 15 can thereby be pivoted about the kink line 17.

Figure 6:
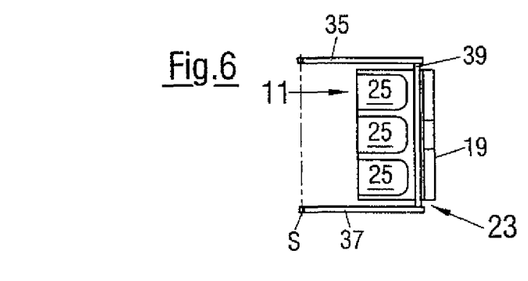
FIG. 6 a plan view of an exemplary pivoting device of the transfer devices of FIGS. 1 to 5.

FIG. 6 shows a plan view of a gripping device 19 engaging beneath a product carrier 11 to illustrate a possible embodiment of the hoop 23. As shown, the hoop can have two mutually spaced apart hoop arms 35, 37, wherein a respective end of each hoop arm 35, 37 is arranged at the gripping device 19 pivotable about the pivot axis S. The ends of the hoop arms 35, 37 remote from the pivot axis S are connected to one another via a further hoop arm 39.

As FIGS. 1 to 5 additionally show, the claw-like upper side of the gripping device 19 has a slope which increases starting from the respective front edge and behind which the hoop 23, in particular the hoop arm 39 shown in FIG. 6, is arranged. An at least slight raising of the cover section 15 takes place by the slope when the gripping device 19 is moved beneath the cover section 15.

Figure 7:
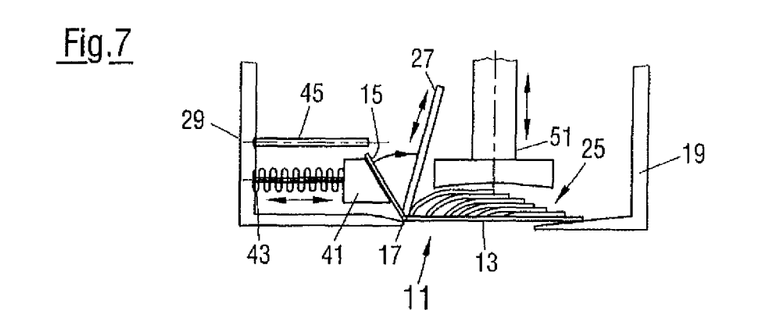
FIG. 7 a side view of a further variant of a transfer device in accordance with the invention.

FIG. 7 shows another variant of a transfer device which can in turn in particular be a robot gripper for picking up at least one product 25 disposed on a base section 13 of a product carrier 11 and the product carrier 11. The transfer device in turn comprises a first gripping device 19 as well as a second gripping device 29 that are formed in the manner of gripping claws. The gripping devices 19 and 29 can be moved toward one another and can in so doing engage beneath the product carrier 11. As shown, the gripping devices 19, 29 preferably engage beneath the product carrier 11 such that the second gripping device 19 engages beneath the cover section 15, coming from the side remote from the base section 13, while the first gripping device 19 engages beneath the base section 13, and indeed coming from the side remote from the cover section 15. The second gripping device 29 has a slide element 41 that is arranged at the gripping device 29 such that it is located in front of the edge of the cover section 15 remote from the base section 13 when the gripping device 29 at least partly engages beneath the cover section 15. The slide element 41 can be moved in the direction of the cover section 15, whereby it comes into contact with the cover section 15 and pivots it, as is shown in FIG. 7. For this purpose, the slide element 41 is preloaded in the direction of the cover section by means of a spring 43 such that the slide element 41 can be moved from a starting position, not shown, into an end position, not shown, for pivoting the cover section 15. The spring 43 is supported at a side wall of the gripping device 29.

In addition, an abutment 45 for the cover section 15 can be arranged at the side wall of the gripping device 29. The abutment 45 can in particular be formed in the manner of a pin or of a plate that extends from the side wall at least substantially in parallel with the claw engaging beneath the cover section 15. The abutment 45 is in this respect located above the slide element 41, as FIG. 7 shows. The abutment 45 can be brought into contact with the cover section 15, in particular after the cover section 15 has been pivoted upwardly by approximately 90° by means of the slide element 41. The abutment 45 is preferably brought into contact with the cover section 15 after the moving back of the slide element 41 into its starting position by means of a movement of the gripping device 29 in the direction of the cover section 15 and is moved toward said cover section 15 for a further pivoting thereof.

Before the movement of the gripping device 29 in the direction of the cover section 15, a downholder 27 that fixes the product carrier 11 in the region of the kink line 17 can be moved away upwardly in order not to block a further pivoting of the cover section 15 by means of the abutment 45.

As FIG. 7 shows, a further downholder 51 can additionally be provided for fixing the product 25 on the product carrier 11 and can be moved up and down and is lowered onto the product 25, coming from above, to fix the product 25 and the product carrier 11. The downholder 51 can, like the downholder 27, too, be integrated in the transfer device. The downholders 27, 51 can, for example, be moved along together with the gripping devices 19, 29 and the picked up combination of product 25 and product carrier 11, in particular to place the picked up combination in a packaging.

The height of the abutment 45, that is its spacing from the upper claw side, can be adjustable. In addition, the two gripping devices 19, 29 can carry out a kind of asymmetrical gripping movement. In this respect, the gripping devices 19, 29 carry out different closing movements and/or cover distances of different lengths to pick up the combination of the product 25 and the product carrier 11.

Figure 8:
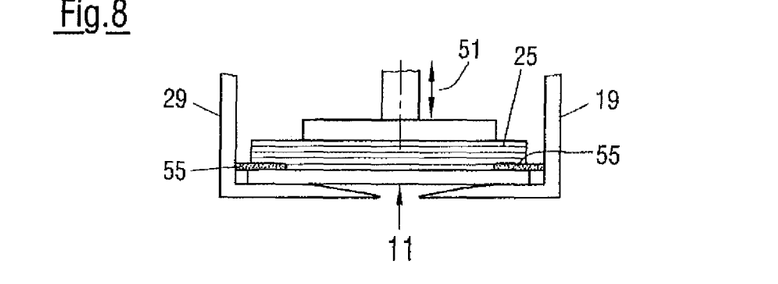
FIG. 8 a side view of a further variant of a transfer device in accordance with the invention.
Figure 9:
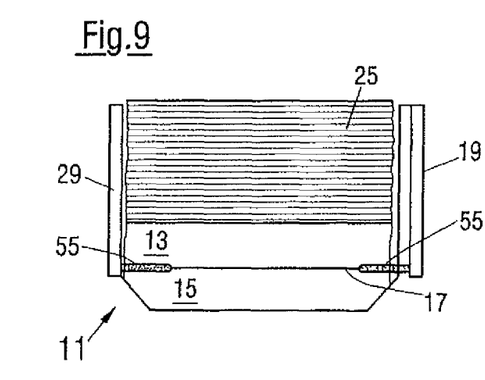
FIG. 9 a plan view of the variant of FIG. 8.

FIGS. 8 and 9 show a transfer device that can likewise in particular be configured as a robot gripper and has the two gripping devices 19, 29 for picking up a product carrier 11 with a product 25 disposed on the base section 15 of the product carrier 11. The two gripping devices 19, 29 can thus be moved toward one another such that the product carrier 11 with the product 25 disposed thereon can be gripped between the two gripping devices 19, 29. Provision is made in this respect that the two gripping devices 19, 29 grasp the product carrier 11 in the region of the base section 13 so that the cover section 15 is freely accessible.

Figure 10:
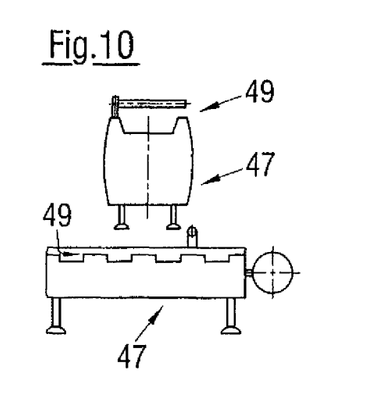
FIG. 10 views of a folding device of the variant of FIG. 8.

The gripping devices 19, 29 can be moved such that they deliver the cover section 15 to a folding device 47 shown schematically in FIG. 10. The folding device 47 has a receiver 49 into which the cover section 15 can be introduced. The cover section 15 can be pivoted relative to the base section 13 about the kink line 17 by a movement of the gripping devices 19, 29 relative to the rigid folding device 47.

In a modification of the folding device 47, not shown, the receiver 49 can be arranged movably such that the receiver 49 can be moved additionally or alternatively to the gripping devices 19, 29 to pivot the cover section 15.

The transfer device of FIGS. 8 and 9 can have a downholder 51 that is, for example, configured in the form of a stamp and is movable up and down to fix the product 25 and the product holder 11.

The gripping devices 19, 29 have a respective holding device 55 by means of which the base section 13 can be held in contact with the claw blade of the respective gripping device 19, 29. The holding device 55 is formed by a pin-like element that extends above the claw blade and in parallel with its outer edge. A gap is formed between the support surface formed by the claw blade and the element and approximately corresponds to the thickness of the product carrier 11 and into which the product carrier 11 can be threaded while it is being gripped beneath by the gripping devices 19, 29.

Figure 11:
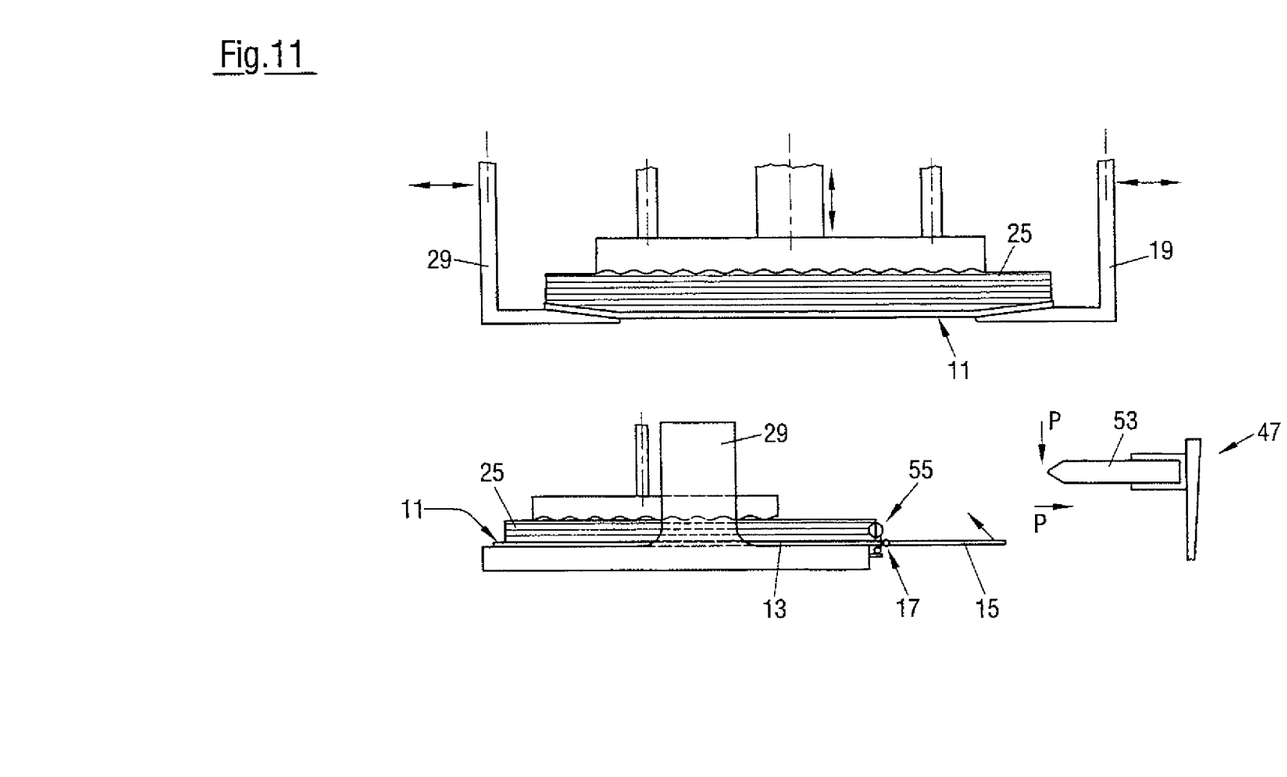
FIG. 11 a further variant of a transfer device in accordance with the invention.

FIG. 11 shows a transfer device modified with respect to the apparatus of FIGS. 8 and 9 having the gripping devices 19 and 29 that can grasp a product carrier 11 with a product 25 disposed thereon such that the cover section 15 of the product carrier 11 is freely accessible. In addition, FIG. 11 shows a modified folding device 47 that comprises an abutment 53 which the cover section 15 is led past. The transfer device in particular travels the distance indicated by the arrows P. The cover section 15 is thus brought into contact with the abutment 53, coming from above, and is upwardly pivoted. When the base section 13 of the product carrier 11 is beneath the abutment 53, the gripping devices 19 and 29 move in the horizontal direction as is indicated by the lower, horizontally extending arrow P. A further pivoting of the cover section 15 by the abutment 53 thereby takes place.

The transfer device can in turn have a holding device 55 at the front edge of each gripping device 19, 29 along which front edge the kink line 17 of a picked up product carrier 11 substantially extends, said holding device fixing the product carrier in the region of the kink line. A pivoting about the kink line 17 is thereby particularly advantageously ensured.

Figure 12:
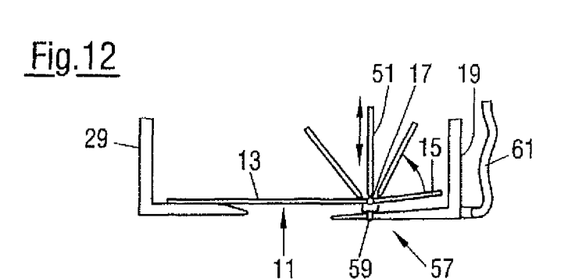
FIG. 12 a side view of a further variant of a transfer device in accordance with the invention.
Figure 13:
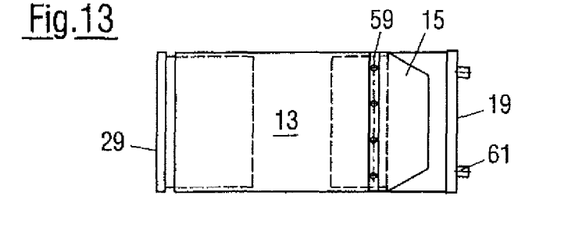
FIG. 13 a plan view of the transfer device of FIG. 12.

FIGS. 12 and 13 show a further variant of a transfer device having two movable gripping devices 19, 29 that can pick up a product carrier with a product 25 disposed thereon. In this respect, the two gripping devices 19, 29 each grip beneath the product carrier 11. The gripping device 19 has a suction apparatus 57 that comprises a suction rail 59 that is integrated in the upper side of the claw of the gripping device 19 engaging beneath the product carrier 11. To generate a vacuum in the suction rail 59, a hose 61 is led away from the suction rail 59 via which the suction rail 59 is connected to a pump or the like for producing the vacuum.

The suction rail 59 is preferably integrated in the upper side of the claw such that it is located at least substantially beneath the kink line 17 when the gripping device 19 engages beneath the product carrier 11. The product carrier 11 can be sucked in by means of the vacuum rail 59 and can in particular be fixed in the region of the kink line 17. The downholder 51 can furthermore act from above on the product carrier 11 to fix the product carrier 11.

A pivoting of the cover section 15 can be effected via a pivoting device, not shown, such as, for example, via a hoop 23 described with respect to FIGS. 1 to 3.

Figure 14:
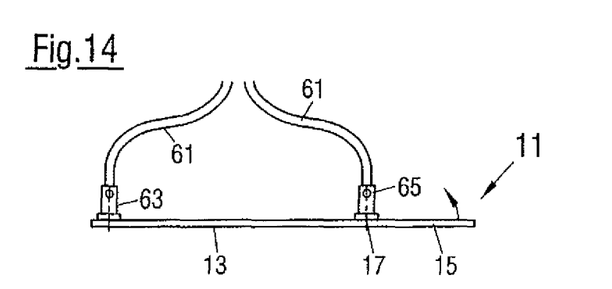
FIG. 14 a side view of a further variant of a transfer device in accordance with the invention.

FIG. 14 shows a transfer device having two suction cups 63, 65 that are connected via a respective hose 61 to a vacuum producing device such as a pump (not shown). The suction cups 63, 65 can be moved, in particular independently from one another, to pick up a product carrier 11. The suction cups 63, 65 can in particular be arranged at the base section 13 and can thus suck in the base section 13 by producing a vacuum, with the cover section 15 preferably being exposed. The fixed product carrier 11 can, for example as was described above with respect to FIGS. 10 and 11, be pivoted by means of a folding device 47.

Figure 15:
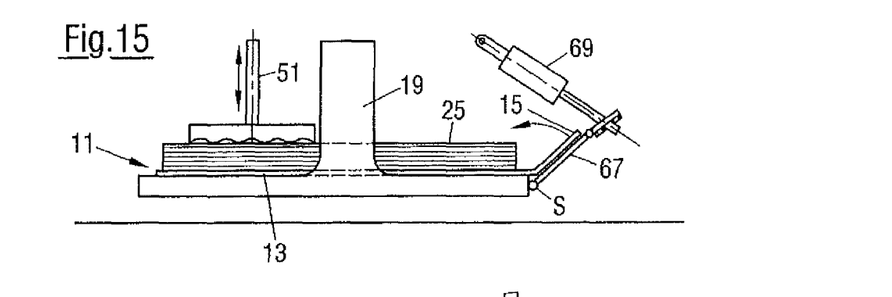
FIG. 15 a side view of a further variant of a transfer device in accordance with the invention.

FIG. 15 shows a transfer device having preferably two gripping devices 19, 29 that can pick up, as was described above, for example, with respect to FIGS. 8 and 9, a product holder 11 with a product 25 disposed on the base section 13 of the product carrier 11. A downholder 51 that can be lowered from above is provided for fixing the product 25 and the product holder 11. The gripping devices 19, 29 pick up the product holder 11 such that the cover section 15 of the product holder 11 is arranged above a flap 67. The flap 67 is arranged at at least one of the gripping devices 19, 29 pivotable about a pivot axis S. The flap 67 can, for example, be formed from sheet metal or from plastic. The flap 67 is coupled to a drive 69 which is arranged at the gripping device 19 and by means of which the flap 67 can be pivoted about the pivot axis S. The drive 69 preferably has a pneumatic cylinder having a pneumatically actuable piston, wherein a pivoting of the flap 67 can be achieved by traveling the piston. This pivoting is a completely independent movement with respect to the position and movement of the gripping device 19, 29.

Figure 16:
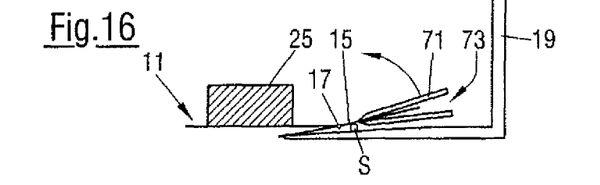
FIG. 16 a lateral part view of a further variant of a transfer device in accordance with the invention.

FIG. 16 shows a transfer device for picking up a product carrier 11 with a product 25 disposed thereon, said transfer device likewise in turn having at least one movable gripping device 19 that is configured for an at least part engaging beneath at least the cover section 15 of the product carrier 11. The gripping device 19 in turn comprises a claw blade that can be brought beneath the cover section 15. A flap 71 having a slit 73 into which the cover section 15 can be threaded by the claw blade on the engagement beneath the cover section 15 is arranged at the upper side of the claw blade. The flap 71 is pivotable about a pivot axis S such that a pivoting of the cover section 15 about the kink line 17 can be achieved by a pivoting of the flap 17 about the pivot axis S. After the pivoting of the cover section 15, the flap 71 can be moved upwardly and/or to the side to release the cover section 15. Subsequently, the cover section 15 can be pivoted onward by means of a further folding device that is not shown in FIG. 16 and can thus be "completely" folded.

Alternatively to the flap 71, two slit folding rails can grasp the cover section 15 from the side and can pivot it. After completion of the folding, the folding rails can again be moved to the side to release the cover section 15 (not shown).

Figure 17:
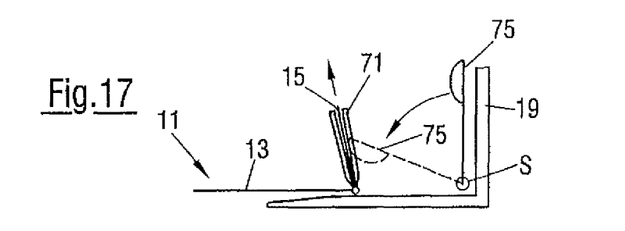
FIG. 17 a lateral part view of a further variant of a transfer device in accordance with the invention.

FIG. 17 shows a modified variant of the apparatus of FIG. 16. With the transfer device in accordance with FIG. 17, a pressing flap 75 is provided that can be pivoted about a further pivot axis S and that can be pivoted about the pivot axis S—after the flap 71 has been moved away upwardly—to further fold the cover section 15.

Figure 18:
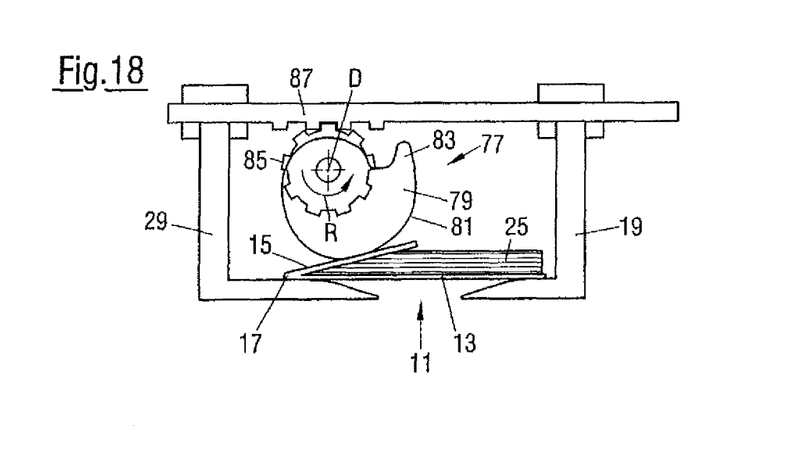
FIG. 18 a side view of a further variant of a transfer device in accordance with the invention.

The transfer device shown in FIG. 18 comprises two gripping devices 19, 29 that can pick up a product carrier 11 with a product 25 disposed thereon. The gripping devices 19, 29 in turn each have a claw blade that can be brought from the side beneath the cover section 15 or the base section 13. To pivot the cover section 15 about the kink line 17, a pivoting device 77 is provided that has a pressing device 79 that is rotatable about an axis of rotation D and that is configured in the manner of a disk of sickle shape in the variant of FIG. 18. The pressing device 79 has at its outer periphery a sickle-shaped contour 81 and a hook-like projection 83 that is disposed, viewed in the direction of rotation R, in front of the sickle-shaped contour 81.

The rotating pressing device 79 can be brought into contact with the cover section 15 already slightly pivoted, e.g. by the wedge-shaped contour of the gripping device 29. The projection 83 can in this respect in particular grasp the cover section 15. The cover section 15 is pivoted, as is shown in FIG. 18, by the further rotational movement during which the sickle-shaped contour 81 is slidingly moved past the cover section 15. To fold the cover section 15, the projection 83 hooks onto the edge of the cover section 15 and pulls it upward. The sickle-shaped outer contour 81 is subsequently moved past or rolled off the previously downwardly facing side of the cover section 15, whereby the cover section 15 is pivoted.

To drive the pressing device 79, it is coupled with a crown gear 85 whose teeth engage into the teeth of a gear rack 87 that is in turn coupled with a motor, not shown. A crank drive can also be provided to drive the pressing device 79. A pneumatic drive can e.g. be used as the drive. The closing movement of the gripping device 29 can also be used to drive the pressing device 79.

Figure 19:
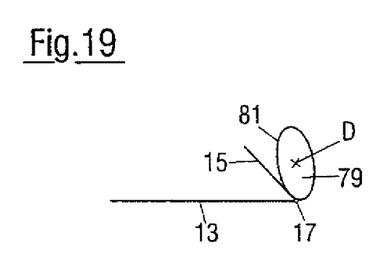
FIG. 19 a lateral part view of a further variant of a transfer device in accordance with the invention.
Figure 20:
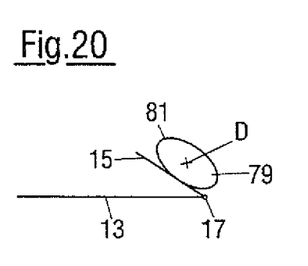
FIG. 20 a further lateral part view of the apparatus of FIG. 19.

FIGS. 19 and 20 show a variant that is modified with respect to FIG. 18 and in which the gripping devices 19, 29 for picking up the product carrier 11 and the product 25 are not shown. The pressing device 79 rotatable about the axis of rotation D has an oval outer contour 81 adapted to the folding procedure and it is therefore movable in parallel with the contact surface of the base section 19 and in particular perpendicular to the kink line 17, e.g. by means of a pneumatic drive, during the folding procedure, that is during the pivoting of the cover section 15 about the kink line 17. The pivoting procedure can be improved by moving the pressing device 79 toward the already upwardly flipped cover section 15 disposed in front of the pressing device 79.

The pressing device 79 can be configured as a compressed air body and/or as a rail. The pressing device 79 can also be formed by a plurality of pneumatic stamps arranged in a row. In accordance with a further development, a plurality of pressing devices 79, in particular a plurality of stamps or of folding bodies, can be attached in different directions and can move outward and inward shortly after one another to pivot the cover section 15.

Figure 21:
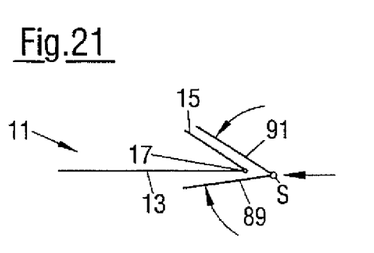
FIG. 21 a lateral part view of a further variant of a transfer device in accordance with the invention.
Figure 22:
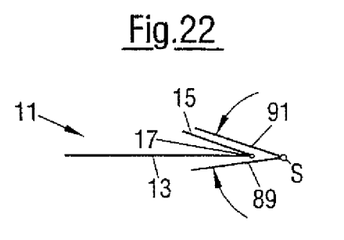
FIG. 22 a further lateral part view of the apparatus of FIG. 21.

FIGS. 21 and 22 show a clamp-like pivoting device. It comprises two limbs 89, 91 that are connected to one another in an articulated manner pivotable about a pivot axis S. In an open position in which the two limbs 89, 91 are e.g. disposed in a plane, the limbs 89, 91 can be brought beneath the cover section 15 or the base section 13 of a product carrier 11 such that the pivot axis S is aligned in parallel with the kink line 17. At least one limb 89, 91, preferably the limb 91 remote from the base section 13, is pivoted about the pivot axis S to form a V-shaped arrangement with the other limb 89. In this respect, the cover section 15 can be entrained and thus likewise pivoted, as FIGS. 21 and 22 show.

Figure 23:
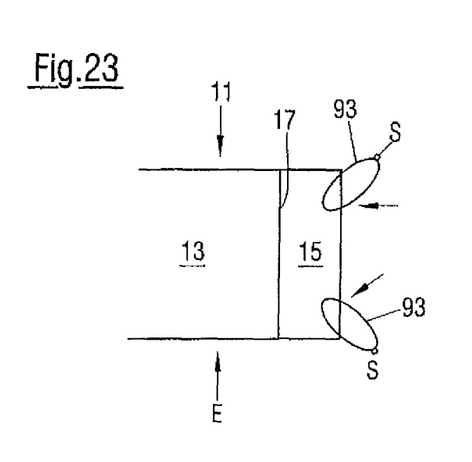
FIG. 23 a plan view of a further variant of a transfer device in accordance with the invention.

FIG. 23 shows a plan view of a pivoting device that has two rotational elements 93 pivotable about a respective pivot axis S. The rotational elements 93 can be arranged within two gripping devices 19, 29 by means of which a product carrier 11 can be picked up (not shown). The pivot axis S extends perpendicular to a plane E in which the flat product carrier 11 is disposed with a not yet pivoted cover section 15. The rotational elements 93 are first disposed in front of the outer edge of the cover section 15 remote from the kink line 17 and are then pivoted about the pivot axis S, whereby they are brought into contact with the cover section 15. The rotational elements 93 can have a wedge-shaped contour such that their front ends can engage beneath the cover section 15. The cover section 15 is pivoted about the kink line 17 by moving the rotational elements 93 onward. The rotational elements 93 can also have a semi-round contour that can in particular be curved in a crescent shape.

Figure 24:
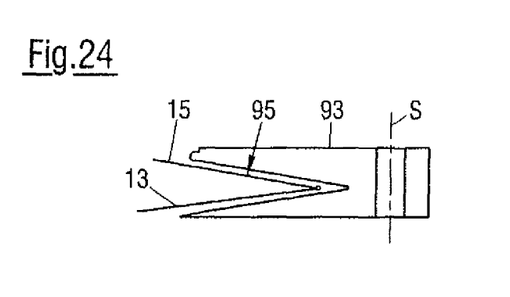
FIG. 24 a modification of the embodiment of FIG. 23.

FIG. 24 shows a modified variant of the apparatus of FIG. 23 in a side view. In the variant of FIG. 24, a respective rotational element 93 has a triangular cut-out 95 that forms an at least slightly spiral slit contour. In this respect, a plurality of rotational elements 93 are—as in the apparatus of FIG. 23—preferably arranged offset from one another, viewed along the kink line 17. The cover section 15 can be threaded into the cut-out 95 and pivoted by rotating the rotational elements 23.

It is advantageous in this respect if the cover section 15 is at least slightly pre-folded before it is threaded into the cut-out 95 of a respective rotational element 93 and is pivoted onward.

REFERENCE NUMERAL LIST 11 product carrier
13 base section
15 cover section
17 kink line
19 gripping device
21 pivoting device 23 hoop
25 product
27 downholder
29 gripping device
31 groove
33 coupling device
35 hoop arm
37 hoop arm
39 hoop arm
41 slide element
43 spring
45 abutment
47 folding device
49 receiver
51 downholder
53 abutment
55 holding device
57 suction apparatus
59 suction rail
61 hose
63 suction cup
65 suction cup
67 flap
69 drive
71 flap
73 slit
75 flap
77 pivoting device
79 pressing device
81 contour
83 projection
85 crown gear
87 gear rack
89 limb
91 limb
93 rotational element
95 cut-out
S pivot axis
P arrow
D axis of rotation
R direction of rotation
E plane

The invention claimed is:

1. A transfer device, in the form of a robot gripper, for picking up at least one product, which is disposed on a base section of a product carrier, and the product carrier from a conveying or processing device for the product or for the product carrier, and for delivering the product together with the product carrier to a device, the device comprising a packaging machine, arranged downstream, the product carrier comprising a cover section and the base section, the cover section being connected to the base section, the transfer device comprising:
 a gripping device comprising a claw, the gripping device at least partly engaging beneath the cover section of the product carrier; and
 a pivoting device arranged at the gripping device for pivoting the cover section about a kink line extending between the cover section and the base section, the pivoting device actuated to pivot the cover section in response to movement of the gripping device, the product carrier and the product picked up by the transfer device and placed directly into a packaging by the transfer device.

2. A transfer device in accordance with claim 1, wherein the transfer device has at least one downholder (27, 51), in particular movable up and down, for holding down the product (25) or for fixing the product carrier (11), in particular along the kink line (17).

3. A transfer device in accordance with claim 1, wherein the gripping device is movable at least partly beneath the cover section of the product carrier that is disposed on a support surface of the conveying or processing device, the gripping device coming from the side remote from the base section or at least from a side in the direction of the kink line, for engaging beneath the cover section.

4. A transfer device in accordance with claim 3, wherein a further, second gripping device (19, 29) is movable to engage beneath the base section at least partly beneath the base section (13) of the product carrier (11) that is preferably disposed on the support surface of the conveying or processing device, in particular coming from the side remote from the cover section (15).

5. A transfer device in accordance with claim 3, wherein the pivoting device is arranged at the gripping device such that it is disposed beneath the cover section at an upper side of the gripping device, when the gripping device at least partly engages beneath the cover section; and
 wherein the pivoting device is adjustable toward the cover section from a starting position into an end position, for pivoting the cover section about the kink line.

6. A transfer device in accordance with claim 5, wherein, for adjusting the pivoting device from the starting position into the end position and from the end position to the starting position, the pivoting device is pivotable about a pivot axis that preferably extends at least approximately in parallel with the kink line.

7. A transfer device in accordance with claim 4, wherein the pivoting device is coupled to the second gripping device (29) and is actuable by means of the second gripping device (29).

8. A transfer device in accordance with claim 3, wherein the pivoting device has a slide element (41) that is arranged at the gripping device (29) such that it is located in front of the edge of the cover section (15) remote from the base section (13) when the gripping device (29) at least partly engages beneath the cover section (15); and
 wherein the slide element (41) is movable in the direction of the cover section (15), in particular by means of a preloaded spring (43), for pivoting the cover section (15).

9. A transfer device in accordance with claim 8, wherein an abutment (45) for the cover section (15) is arranged at the gripping device (29), in particular above the slide element (41), with the abutment (45) being able to be brought into contact with the cover section (15) and being movable toward the cover section (15) for the further pivoting thereof, in particular by means of the movement of the gripping device (29), in particular after the moving back of the slide element (41) into its starting position, by means of a movement of the gripping device (29) in the direction of the cover section (15).

10. A transfer device in accordance with claim 1, wherein the transfer device has at least one gripping device (19, 29) for picking up the product carrier (11) together with the product (25) disposed on the base section (13) with the gripping device (19, 29) picking up the product carrier (11) such that the cover section (15) is freely accessible; and wherein the gripping device (19, 29) delivers the cover section (15) to a folding device (47) by means of which the cover section (15) is pivoted about the kink line (17) relative to the base section (13).

11. A transfer device in accordance with claim 10, wherein the pivoting of the cover section (15) takes place by a movement of the gripping device (19, 29) relative to the folding device (47) that is preferably rigidly arranged in an associated work region; or
wherein the folding device (47) is movable in addition to or alternatively to the gripping device (19, 29) to pivot the cover section (15) by a relative movement between the folding device (47) and the gripping device (19, 29).

12. A transfer device in accordance with claim 1, wherein the pivoting device comprises a suction apparatus (57, 59), in particular a vacuum rail, for fixing and or sucking in the product carrier (11), in particular along the kink line (17).

13. A transfer device in accordance with claim 12, wherein the suction apparatus (57, 59) is arranged at the gripping device (19) for a part gripping beneath the product carrier (11), in particular such that the suction apparatus (57, 59) is arranged at least substantially beneath the kink line (17) when the gripping device (19) engages beneath the product carrier (11) in accordance with its intended purpose.

14. A transfer device in accordance with claim 1, wherein the pivoting device has at least one flap (67) pivotable about a pivot axis (S).

15. A transfer device in accordance with claim 14, wherein the flap (67) is arranged at a gripping device (19) for a part engagement beneath the product carrier (11) pivotable about the pivot axis (S), with a drive (69) that is preferably arranged at the gripping device (19) being provided for pivoting the flap (67).

16. A transfer device in accordance with claim 15, wherein the flap (67) has a slit (73) in which the cover section (15) can be threaded; and
wherein the gripping device (19) is controllable such that it threads the cover section (15) into the slit (13), in particular during the engaging beneath the product carrier (11).

17. A transfer device in accordance with claim 16, wherein the flap (71) is movable upwardly or to the side to release the cover section (15).

18. A transfer device in accordance with claim 16, wherein at least one further movable, in particular pivotable, flap (75) is arranged at the gripping device (19), in addition to the at least one flap (17) having a slit (73), with provision being made that the cover section (15) is pivoted by means of the flap (71) having a slit (73) up to an intermediate position;
wherein the flap (71) having a slit (73) is subsequently moved away upwardly or to the side to release the cover section (15); and
wherein the cover section (15) is then pivoted onward from the intermediate position into a provided end position by means of the further flap (75).

19. A transfer device in accordance with claim 1, wherein the pivoting device has a pressing device (79), in particular a disk or the like, that is rotatable about an axis of rotation (D) and whose outer periphery can be brought into contact with the cover section (15), with the outer periphery having a contour (81), in particular of sickle shape, by means of which a pivoting of the cover section about the kink line (17) is effected by a rotation of the pressing device (79) about the axis of rotation (D); or
wherein the axis of rotation (D) extends eccentrically to the center of the pressing device (79) and a pivoting of the cover section (15) about the kink line (17) is effected by a rotation of the pressing device (79) about the axis of rotation (D).

20. A transfer device in accordance with claim 19, wherein the pressing device (79) can be driven by means of a movement of the gripping device (19, 29).

21. A transfer device in accordance with claim 19, wherein the axis of rotation (D) is adjustable, in particular relative to the cover section (15) or to the gripping device (19, 29).

22. A robot having a transfer device in accordance with claim 1,
wherein the transfer device forms a gripper or at least a part of the gripper of the robot.

23. A conveying line having a transfer device in accordance with claim 1,
wherein the transfer device is arranged between the conveying or processing machine and the packaging machine, viewed in the conveying direction, or
wherein the robot is configured to transfer a product carrier with a product disposed thereon by means of the transfer device from the conveying or processing device to the packaging machine.

24. A method of handling products, in particular portions, that comprise one or more slices cut off from a food product such as a loaf of sausage or cheese, in which
a product carrier (11) that comprises a base section (13) and a cover section (15) connected to the base section (13) and that serves to carry at least one product (25) lying on the base section (13) is fixed on a support;
the cover section (15) is pivoted onto a lying product (25);
the product carrier (11) together with the product (25) fixed between the base section (13) and the cover section (15) is fixed with respect to the support by means of a downholder; and
the product carrier (11) together with the product (25) is picked up by means of a transfer device, gripping between the support and the base section (13).

25. A method in accordance with claim 24,
wherein the pivoted cover section (15) is fixed.

* * * * *